MOUNTING FOR AN AIR BEARING MAGNETIC TRANSDUCER HEAD

Filed Oct. 1, 1965

INVENTOR
RICHARD J. LA MANNA
BY David [signature]
ATTORNEY

United States Patent Office 3,475,739
Patented Oct. 28, 1969

3,475,739

MOUNTING FOR AN AIR BEARING MAGNETIC TRANSDUCER HEAD

Richard J. La Manna, Whippany, N.J., assignor to Litton Business Systems, Inc., a corporation of New York Filed Oct. 1, 1965, Ser. No. 491,939
Int. Cl. G11b 5/30
U.S. Cl. 340—174.1 11 Claims

ABSTRACT OF THE DISCLOSURE

A magnetic transducer comprises a flexible, nonconductive substrate having formed thereon a thin, flexible metallic transducing means. The transducing means comprises at least two large land areas interconnected by a thin, flexible metallic reading element. The magnetic transducer is held in tension with respect to the surface of a magnetizable drum such that it is spaced, during the rotation of the drum, by surface air.

This invention pertains to magnetic transducers and more particularly to recording and/or playback transducing means for use with magnetizable record media and further pertains to a unique mounting arrangement for magnetic transducers which permits minimum spacing to be maintained between such transducers and the surface of the magnetizable media.

As is well known in the art of magnetic recording the flux available for recording upon any discrete portion of a magnetic record is dependent upon the size of the transducer, the distance of the transducer from the recording media, and the strength of the signal applied for such recording. In a similar fashion, other factors such as size of transducer, spacing and recorded strength of the signal upon the magnetic media are determinative of the signal available ofr readout from a previously recorded magnetic record. In an effort to minimize the size of the conductor employed for the main element of a read/record transducer the use of a single turn coil has long been employed. This coil was then rigidly mounted on a head supporting assembly in order to control the distance of the transducer from the magnetic media. Uneveness in the surface of the media, such as variations in the roundness or the diameter of the magnetic record, be it a magnetic drum or magnetic disc, effected the spacing between the transducer and the magnetic media surface. Items such as dirt or wear of the bushings of the support members of the drum or disc would further add to problems of spacing which exist. Slight movements or increases in the spacing between the media surface and the transducer wire coil would have great effects on the recording strength and the playback strength by diminishing the amount of flux which would be available for recording or reading.

In one form of single turn transducer, a single turn of approximately one-thousandth of an inch diameter wire is employed. The transducer placed at a distance of one-thousandth of an inch from the surface of a drum would require approximately 15 amps. applied to the wire in order to permit recording of information with sufficient strength on the magnetic record media. Such currents were difficult to handle and made melting of the wire used for the single turn coil a frequent occurrence. The employment of multiturn windings to reduce the number of amperes of current required to produce a usable record introduced additional problems such as increasing the recorded zone and thus reducing the total density of recording paths which might be possible on any given surface area. Air bearing heads have been recently proposed in the art, which permit a bearing to be created between the surface of a rotating magnetic media and an element held closely adjacent to surface thereof. Such devices however employ reasonably rigid supporting mechanisms to provide the course positioning adjustments and employ the air bearing concept only to provide the capability of a vernier adjustment between the device and the surface of the media. With such an arrangement the conformity of the magnetic transducer to the surface of the magnetic record is reasonably poor. It is therefore an object of this invention to provide an improved form of magnetic transducer for reading information from and/or recording information upon the surface of magnetizable media.

It is another object of this invention to provide an improved form of magnetic transducer which is simple to construct, low in cost and subject to fabrication in large numbers.

It is still another object of this invention to provide an improved form of magnetic transducer which is capable of close conformity with the surface of magnetizable media.

It is yet another object of this invention to provide an improved form of magnetic transducer having low mass and acted on by high force components whereby it is capable of maintaining close conformity with the surface of magnetizable media.

It is still another object of this invention to provide an improved form of magnetic transducer for recording on and/or reading from a plurality of channels upon magnetizable media which is capable of maintaining close conformity with the variations in surface of magnetizable media.

It is yet another object of this invention to provide an improved magnetic transducer whose position and conformity with the surface of magnetizable record media is controlled by the coaction of the air film effects due to the relative movement between the magnetizable media and a biasing means.

It is still another object of this invention to provide a magnetic transducer capable of operation with a plurality of channels upon the surface of a magnetizable record media which transducers are capable of individual conformity with variations in the surface of the associated magnetizable recording media.

Other objects and features of the invention will be pointed out in the following description and claims and illustrated in the accompanying drawings, which disclose, by way of example, the principle of the invention, and the best modes which have been contemplated for carrying it out.

Broadly stated, the invention comprises the formation of a magnetic transducer consisting of a single small conductive element and a pair of interconnecting larger conductive means whereby a single turn coil is established. In one embodiment, the entire single turn coil structure is mounted upon a compliant supporting media, such as a Mylar tape. The supporting media then is anchored at one end to a fixed position adjacent the surface of the magnetizable media which may be, for example, rotatable. A second end of the supporting media is connected, by means of a tension member to a second fixed position adjacent the rotating magnetizable media. The positions of the mounting members, with respect to the rotating magnetizable record, are such that the supporting media will extend along a sector of the surface of the magnetizable media. The effect of the tension member will be to cause the supporting media to be drawn toward a position in contact with the surface of the magnetizable media. Contact, however will not be permitted between the supporting media and the surface of the magnetizable media due to the formation of an air film between the surface of the magnetizable media and the surface of the supporting media. As a result of the interaction between the air film and the tension member the relative position of the transducer will be accurately controlled.

In the figures.

Similar elements will be given similar reference characters in each of the respective figures.

Figure 1:
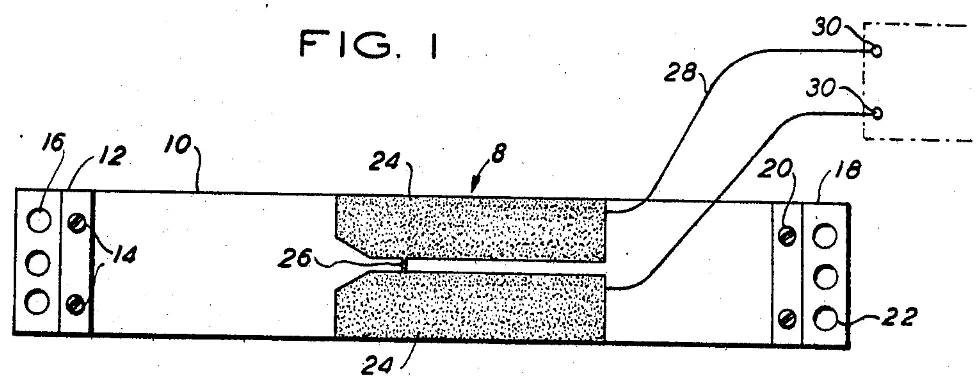
FIG. 1 illustrates the arrangement of a magnetic transducer constructed in accordance with the concepts of this invention.

Turning now to FIG. 1 there is shown the arrangement of a transducer 8 constructed in accordance with the basic concepts of this invention. The transducer 8 is composed of a compliant supporting member 10 which may be fabricated from Mylar, nylon or some other strong and flexible or compliant material. At one side there is a mounting plate 12 which is fastened by means of fasteners 14 to the compliant support member 10. A series of apertures 16 also appear in the mounting plate 12 to permit the mounting plate 12 to be affixed to a support or wall mount adjacent the magnetic media as will be set forth below. At the other end of the compliant support member 10 there appears a further mounting plate 18 also fastened to the support member 10 by means of fasteners 20 and provision is made for a series of apertures 22 to permit mounting to a second mounting position, as will be set forth below.

The transducing means of the transducer 8 comprises a so-called single turn coil composed of large conductive lands 24 with a thin wire connection or other connecting means 26 therebetween. A pair of conductors 28 are coupled to the lands 24 to complete the circuit. The conductors 28 may be coupled at terminals 30 to a transformer, if such is desired, and then, in turn, selectively to a source of writing current and/or to a readout amplifier (not shown). The size of the wire 26 is extremely small with respect to the conductive lands 24. Lands 24 permit the handling of a large amount of current without providing too great a current density. The wire 26 which is employed for recording and/or for reading is small in size so as to minimize the recording surface with respect to the magnetic media and to permit the smallest possible recording area and thus increase greatly the recording density achievable with a given magnetic record. The length of the wire 26, that is, the distance between the lands 24 will be approximately twenty-thousandths of an inch.

To achieve such an arrangement it is possible to construct the lands and wire from a copper, silver, gold, or platinum coated or clad Mylar or nylon tape from which the metal has been selectively etched away to leave a transducing structure of the desired shape, as shown. Alternatively, a Mylar or nylon tape support member may be employed as a substrate upon which a thin film of the desired metals may be vapor deposited in the shape desired. Due to the small size of the components of the transducer the transducer will have a very low mass.

Figure 2:
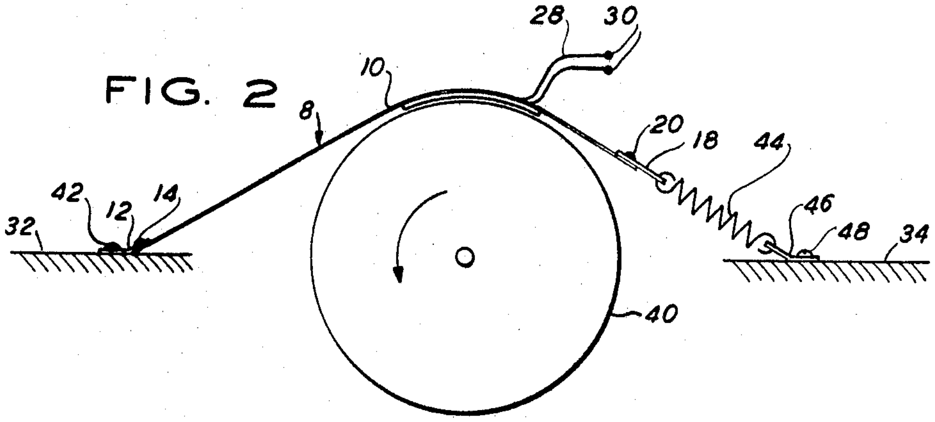
FIG. 2 shows the arrangement for mounting the transducer of FIG. 1 with respect to a rotating magnetizable media.

Turning now to FIG. 2 there is shown the manner of mounting the transducer 8 of FIG. 1 with respect to a magnetizable record media which in this example is a rotatable medium 40. The first mounting plate 12 is mounted upon a side wall of the housing or support member 32 (not fully shown) of the magnetic record media 40 by means of fasteners 42. The second portion of the support member 10 will be connected, via a tension member or spring 44, to a further portion of the side wall of the housing or upon a support member 34 (not fully shown) of the magnetic media 40. This will be accomplished by means of a further mounting plate 46 fastened by means of fasteners 48 to the side wall 34. The tension spring 44 may be adjusted to exert sufficient tension upon the support member 10 to bring the support member 10 into contact with the surface of the magnetic record media 40 if the media 40 is stationary. However as the magnetic record media 40 is rotated by a motor (not shown) at sufficient speed a surface air film will be built up. This film will act to hold the support member 10 away from the surface of the media 40. By selecting the size of the media 40, that is, its diameter, by controlling its speed, and the tension exerted by means of the tension spring 44, the distance between the wire 26 on the support member 10 and the media 40 may be closely controlled. The combination of a low mass of the transducer 8 and high force components upon it permit the transducer 8 to conform to the surface of the media 40 despite surface variations thereof. Because the thickness of the lands 24 and the wire 26 may be held to close tolerances, as is well-known in the art, it is possible to maintain distances of one ten-thousandth of an inch between the exposed surface of the wire 26 and the magnetizable recording media 40. As a result it is possible to record a satisfactory area or to read the signal from such an area employing but one to two amperes of current in distinction to prior art devices which maintain spacings of one-thousandth of an inch and required currents in the range of 15 amperes for satisfactory recording.

Figure 3:
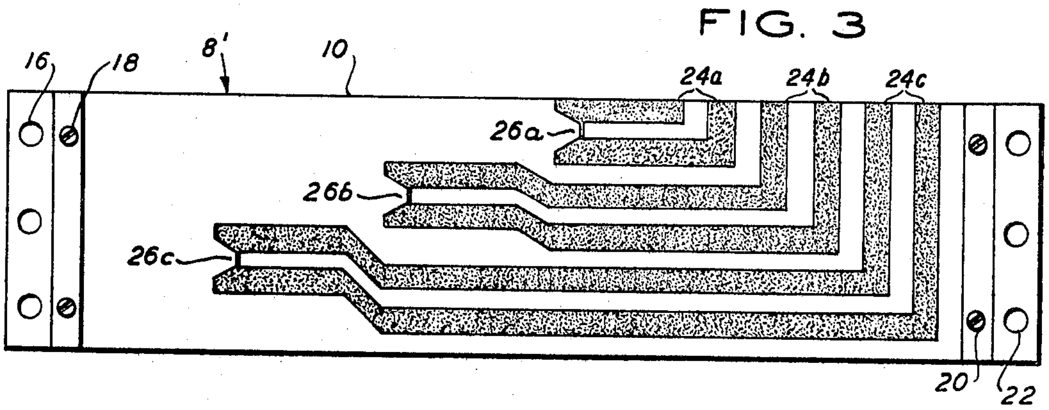
FIG. 3 shows the arrangement of a plurality of transducers upon a supporting media capable of recording and/or reading a plurality of channels upon magnetizable media.

Turning now to FIG. 3 there is shown an arrangement whereby a plurality of the individual single turn recording transducing means 20*a*, *b*, and *c* are placed upon a single support member 10 of a transducer 8'. In this arrangement the individual wires 26*a*, 26*b*, and 26*c* are staggered so that they may record and/or read in closely spaced channels upon the magnetic recording media such as 40 of FIG. 2. The staggering, as shown in FIG. 3 permits the individual wires 26*a* through 26*c* to be placed more closely than would be possible if they were placed in a straight line along a single transverse line to the support 10. In this manner the packing density may be greatly increased over that possible in such a straight line arrangement. The individual lands 24*a*, *b*, and *c* are brought out to one central portion of the support member 10 and may be connected by means of a suitable connecting means (not shown) to terminals (not shown) for connection to read amplifiers and/or sources of recording current (not shown). The manner of operation of the device is the same as that described with reference to FIG. 1 for each of the individual single turn transducing means.

While there have been shown and described and pointed out the fundamental novel features of the invention as applied to the preferred embodiments, it will be understood that various omissions and substitutions and changes of the form and details of the devices illustrated and that its operation may be made by those skilled in the art, without departing from the spirit of the invention.

The embodiments of the invention in which an exclusive property or privilege is claimed are defined as follows:

1. A magnetic transducer, adapted for either recording upon or reading from magnetizable record medium during relative movement between the transducer and the record media, comprising:

means for transducing electrical energy into magnetic flux or magnetic flux into electrical energy upon being proximate the medium surface during the relative movement; and means for flexibly supporting said transducing means; said transducing means adapted to flex or bend with said supporting means.

2. A magnetic transducer as recited in claim 1 wherein said transducing means includes a plurality of lands of conductive material, said magnetic transducer further including means interconnecting at least two of said lands for the reading or recording.

3. A magnetic transducer as recited in claim 2 wherein said interconnecting means is conductive material of smaller dimension than said lands.

4. A magnetic transducer as recited in claim 3 wherein said lands comprise at least one pair of elongated metal strips, said interconnecting means comprising metallic member, and said supporting means comprising a flexible nonconductive substrate.

5. A magnetic transducer as recited in claim 4 wherein the length of the said member, from one of said lands to another of said lands, is approximately 20,000th of an inch.

6. A magnetic transducer as recited in claim 4 wherein said lands are substantially rectangular metallic strips having one dimension longer than the other thereof, and said member being substantially perpendicular to the longest dimension of said metallic strips.

7. A magnetic transducer as recited in claim 4 wherein there are a plurality of said pairs of lands, each of said pairs of lands is coupled by at least one of said members, each of said pair of lands coupled by said member forming one of said transducing means, each of said members being parallel to another of said members.

8. A magnetic transducer as recited in claim 1 further comprising:

mounting means in combination with said supporting means adapted for holding said transducer in tension with respect to the surface of the medium, said transducing means being spaced from the medium by a layer of air during the relative movement, said transducing means conforming to the surface configuration of the record.

9. A magnetic transducer as recited in claim 8 wherein said mounting means includes a spring member for holding said supporting means in tension with the medium surface.

10. A magnetic transducer as recited in claim 9 wherein said transducing means comprises at least one pair of metallic lands and means interconnecting said lands for the reading or recording comprising a conductive member of smaller dimension than said lands, said supporting means comprising a flexible, nonconductive substrate; the medium being a rotating, magnetizable drum.

11. A magnetic transducer as recited in claim 10 wherein there are a plurality of said lands arranged in pairs, each of said pair of lands being coupled by one of said members, said member in combination with said pair of lands forming one of said transducing means, each of said members being parallel to one another.

References Cited

UNITED STATES PATENTS

| | | | |
|---|---|---|---|
| 2,514,577 | 7/1950 | Heller | 179—100.2 |
| 2,862,781 | 12/1958 | Baumeister | 179—100.2 |
| 3,192,514 | 6/1965 | Ballif | 179—100.2 |
| 3,202,772 | 8/1965 | Thomas et al. | 179—100.2 |
| 3,323,116 | 5/1967 | Solyst | 346—74 |
| 3,249,701 | 5/1966 | Silver | 179—100.2 |
| 3,229,268 | 1/1966 | Solyst | 340—174.1 |
| 3,151,319 | 9/1964 | Marrs | 179—100.2 |

BERNARD KONICK, Primary Examiner

V. P. CANNEY, Assistant Examiner

U.S. Cl. X.R.

179—100.2; 346—74